United States Patent
Groeblacher et al.

(10) Patent No.: US 6,769,899 B2
(45) Date of Patent: Aug. 3, 2004

(54) INDEPENDENT X/Y FLOW ADJUSTABLE EXTRUSION DIE

(75) Inventors: Hans Groeblacher, McPherson, KS (US); James W. Nixon, Salina, KS (US)

(73) Assignee: American Maplan Corporation, McPherson, KS (US)

(*) Notice: Subject to any disclaimer, the term of this patent is extended or adjusted under 35 U.S.C. 154(b) by 288 days.

(21) Appl. No.: 09/912,250

(22) Filed: Jul. 24, 2001

(65) Prior Publication Data

US 2002/0109259 A1 Aug. 15, 2002

Related U.S. Application Data

(60) Provisional application No. 60/267,987, filed on Feb. 9, 2001.

(51) Int. Cl.[7] .............................................. B29C 47/22
(52) U.S. Cl. ........................ 425/381; 425/466; 425/467; 264/177.16; 264/209.2
(58) Field of Search ................................ 425/380, 381, 425/466, 467, 192 R; 264/177.1, 177.11, 177.14, 177.15, 177.16, 209.2; 72/269; 138/42, 44

(56) References Cited

U.S. PATENT DOCUMENTS

| | | | | |
|---|---|---|---|---|
| 3,221,371 A | * | 12/1965 | Stevens | 425/465 |
| 4,181,487 A | * | 1/1980 | Kessler | 425/326.1 |
| 4,465,449 A | | 8/1984 | Hornbeck | 425/131.1 |
| 4,472,129 A | | 9/1984 | Siard | 425/381 |
| 4,518,343 A | | 5/1985 | Seiffert | 425/466 |
| 4,765,936 A | * | 8/1988 | Ballocca | 264/46.1 |
| 4,867,667 A | * | 9/1989 | Moriyama | 425/190 |
| 5,102,602 A | | 4/1992 | Ziegler | 264/209 |
| 5,162,090 A | * | 11/1992 | Arima | 264/167 |
| 5,989,466 A | * | 11/1999 | Kato et al. | 264/40.5 |

* cited by examiner

Primary Examiner—Robert Davis
Assistant Examiner—Joseph S Del Sole
(74) Attorney, Agent, or Firm—Hamilton, Brook, Smith and Reynolds, P.C.

(57) ABSTRACT

An adjustable extrusion die shapes a melt into a non-circular cross-sectional profile form. The wall thickness of the profile is adjustable by moving two adjustment plates orthogonal to each other and transverse to the flow of the melt. Movement of each adjustment plate is restricted to prevent rotation relative to a melt-shaping bushing.

7 Claims, 8 Drawing Sheets

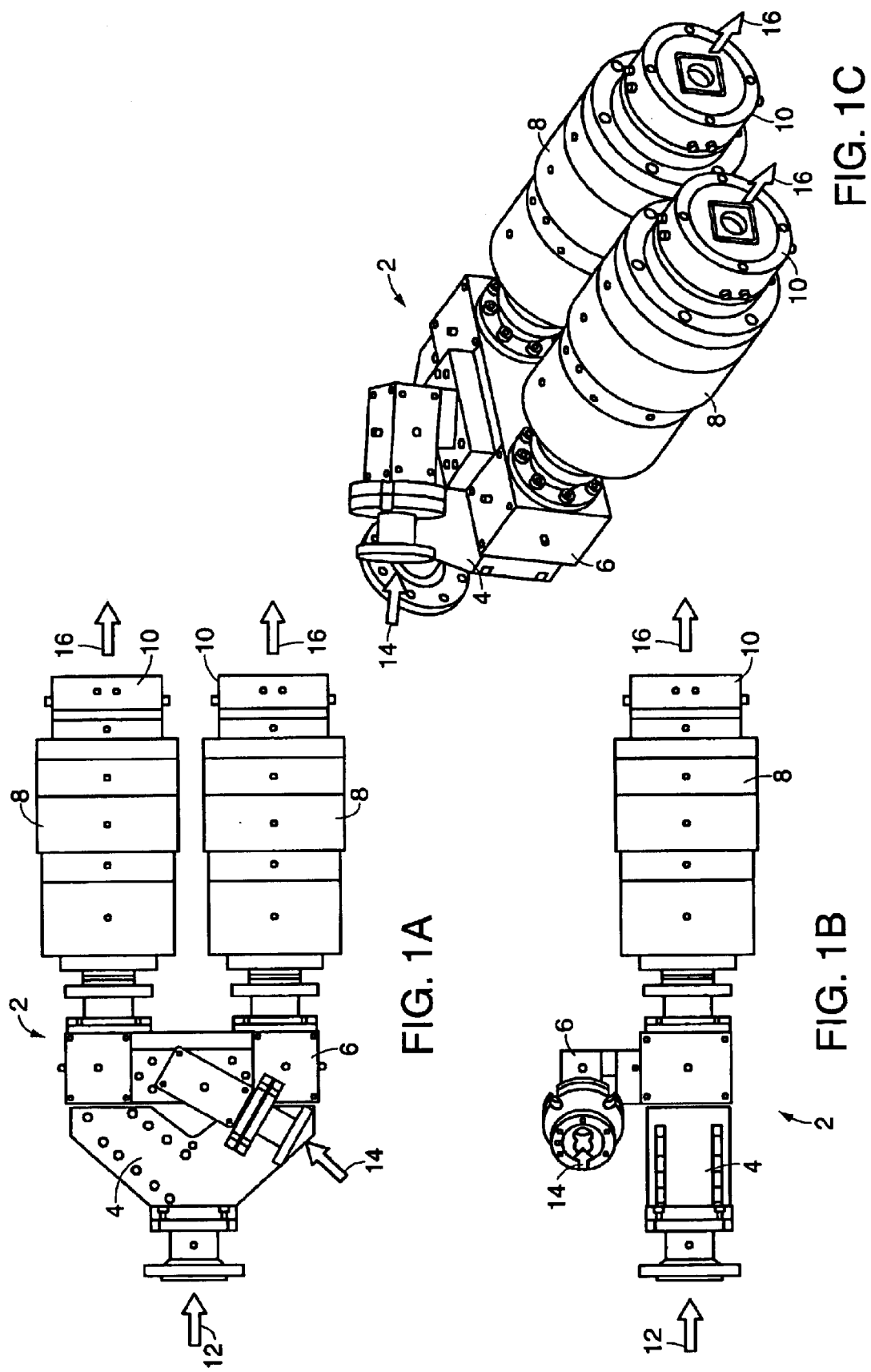

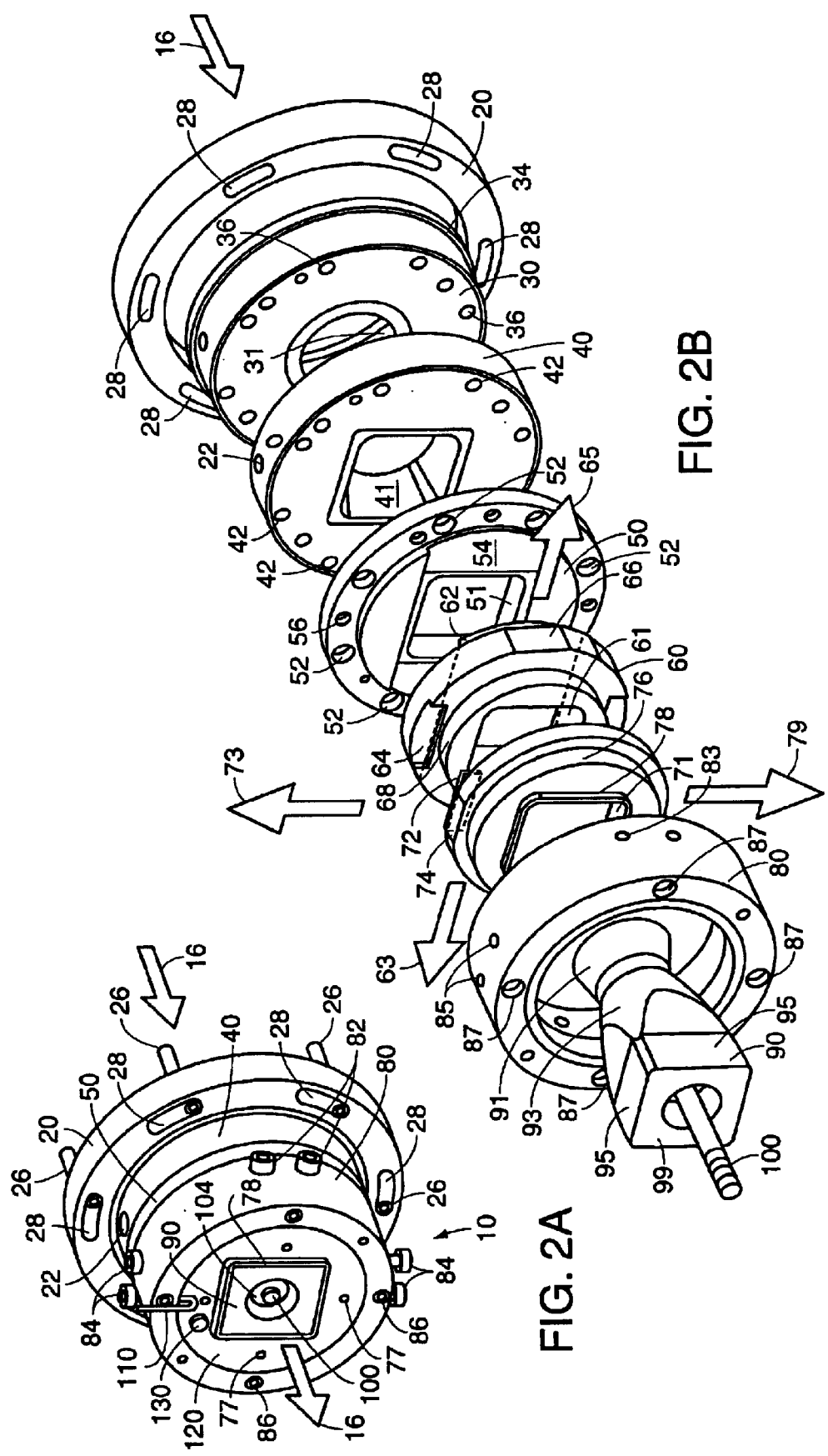

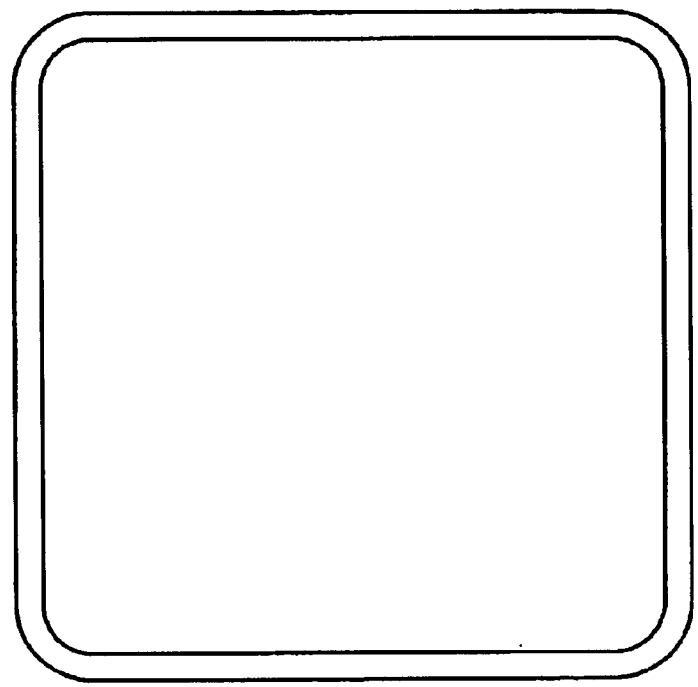
FIG. 6A
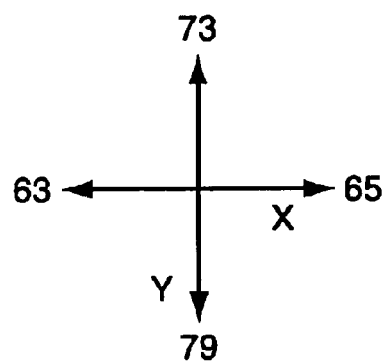
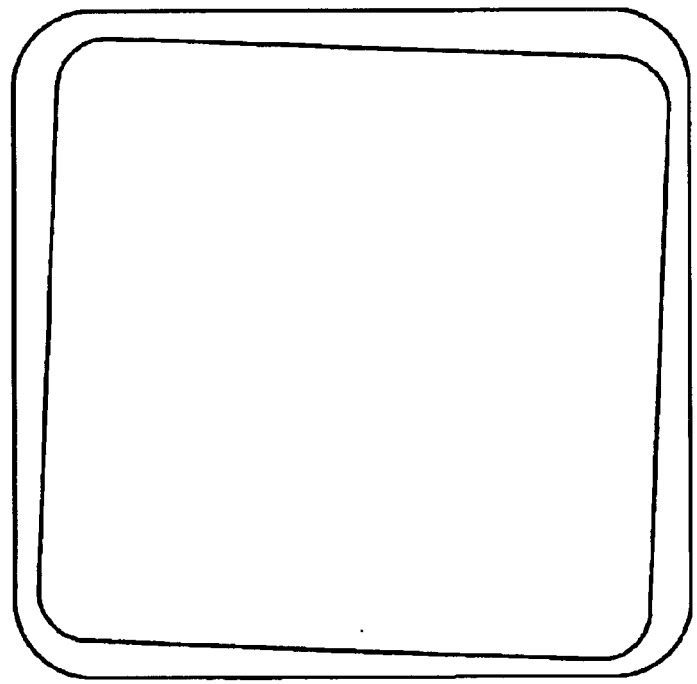
FIG. 6B

INDEPENDENT X/Y FLOW ADJUSTABLE EXTRUSION DIE

RELATED APPLICATION

This application claims the benefit of U.S. Provisional Application No. 60/267,987, filed on Feb. 9, 2001, the entire teachings of which are incorporated herein by reference.

BACKGROUND OF THE INVENTION

In general, an extrusion such as extruded polyvinyl chloride (PVC) pipe is formed by feeding plastic into an extruder where it is subjected to high temperatures to create a molten substrate. The substrate then proceeds through a feed tube, at the end of which additional material known as capstock can be applied if desired. The process of adding additional material to the substrate is known as co-extrusion. The substrate whether or not capstock coated is known as melt. The melt proceeds through an extrusion head, at the end of which the melt passes through a die. The die contains the circular cross-sectional profile shape to be extruded. The melt hardens as it exits the die in the desired cross-sectional form. The hardened material forms a tube that can grow to arbitrary length as additional melt is extruded.

Normally, PVC pipe is produced by extruding molten plastic through a single die of an extruder. In some cases, two PVC pipes are produced simultaneously by extruding molten plastic through a Y-block, a pair of extrusion heads and a pair of dies.

The ultimate shape of the extrusion is determined by a melt flow passage in the die between a bushing which surrounds a pin or mandrel. For circular pipe, the pin is circular in cross-section and an opening in the bushing which surrounds the pin is circular. To obtain a non-circular cross-section, such as a square, a circular extrusion is typically reshaped through a transition bushing and pin which are circular at the inlet and square, for example, at the outlet.

SUMMARY OF THE INVENTION

One problem that arises, based on the current method and applied die technology is that it is extremely difficult to consistently extrude non-circular cross-section profiles, and correction of tolerance errors inside the extrusion die require interruption of the extrusion process. With circular cross-sections, adjustment may be provided to shift the bushing relative to the pin to obtain an extrusion of uniform thickness. However, with non-circular cross-sections, where rotation of the bushing relative to the pin cannot be tolerated, prior approaches are not feasible.

In accordance with the invention, there is provided a method and an extrusion die for adjusting the wall thickness of a non-circular cross-sectional profile without stopping the extrusion process.

The invention achieves this result by providing an extrusion die which contains a bushing plate, a profile pin and a first adjustment plate. The bushing plate has a flow path which shapes the exterior profile of the melt. The profile pin is located within the flow path of the bushing pin and shapes the interior profile of the melt. The first adjustment plate faces the bushing plate and surrounds the profile pin and may be moved in a direction transverse to the flow of the melt to provide a shift of the non-circular cross-sectional profile of the flowing melt. The movement of the first adjustment plate is restricted to prevent rotation relative to the bushing plate or may restrict movement along a first transverse axis.

A second adjustment place which faces the first adjustment plate and surrounds the profile pin may be moved orthogonal to the first adjustment plate to provide a shift of the non-circular profile of the flowing melt. The movement of the second adjustment plate is restricted to prevent rotation relative to the first adjustment plate.

A first bushing plate defines a flow path which maintains the circular cross-sectional profile exterior of the flowing melt. A second bushing plate defines a flow path which shapes the circular melt exterior to the desired non-circular cross-sectional profile exterior of the flowing melt. A third bushing plate defines a flow path which maintains the desired non-circular cross-sectional profile exterior of the flowing melt.

A first section of the profile pin defines a flow path which maintains the circular cross-sectional interior of the flowing melt. A second section of the profile pin defines a flow path which shapes the circular melt interior to the desired non-circular cross-sectional profile interior of the flowing melt. A third section of the profile pin defines a flow path which maintains the desired non-circular cross-sectional profile interior of the flowing melt.

A bushing plate comprising non-circular cross-sectional surfaces defining a flow path through the bushing plate to maintain the desired non-circular cross-sectional profile. Opposing protrusions at a distal end from a face of the bushing plate defining at a distal end an adjustment channel which receives shoulders of a first adjustment plate and locates the first adjustment plate therein to prevent rotation of the first adjustment plate relative to the bushing plate.

A first adjustment plate comprising non-circular cross-sectional surfaces defining a flow path through the first adjustment plate to maintain the desired non-circular cross-sectional profile. Shoulders at a proximal end from a face of the first adjustment plate which maybe moved within an adjusting channel of the bushing plate to prevent rotation of the first adjustment plate relative to the bushing plate. Opposing adjusting channels from a distal face which receive shoulders of the second adjustment plate and locate the second adjustment plate therein to prevent rotation of the second adjustment plate relative to the first adjustment plate.

A second adjustment plate comprising non-circular cross-sectional surfaces defining a flow path through the second adjustment plate to maintain the desired non-circular cross-sectional profile. Opposing shoulders at a proximal end from a face of the second adjustment plate moveable within adjusting channels of the first adjustment plate to prevent rotation of the second adjustment plate relative to the first adjustment plate.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A–C show plan, side and perspective views of a dual co-extrusion set-up;

FIGS. 2A–B show assembled and exploded views of an extrusion die;

FIG. 6A shows a cross-sectional view of an extrusion where the adjustment plates are located; and FIG. 6B shows a cross-sectional view of an extrusion where the adjustment plates are not located.

DETAILED DESCRIPTION OF THE INVENTION

Figure 3A:
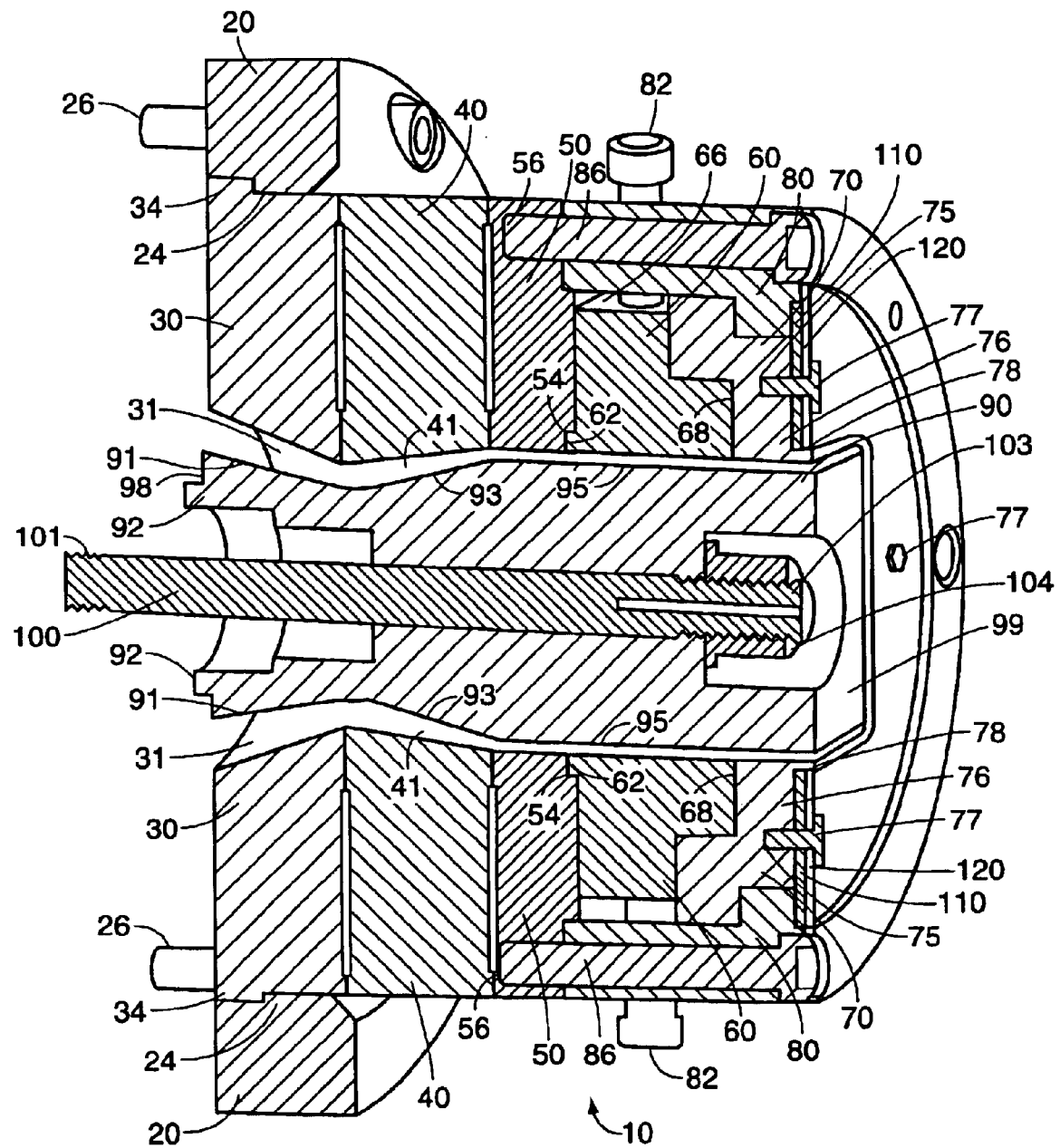
FIG. 3A shows a longitudinal-sectional view of the extrusion die highlighting adjusting plate 1.
Figure 3B:
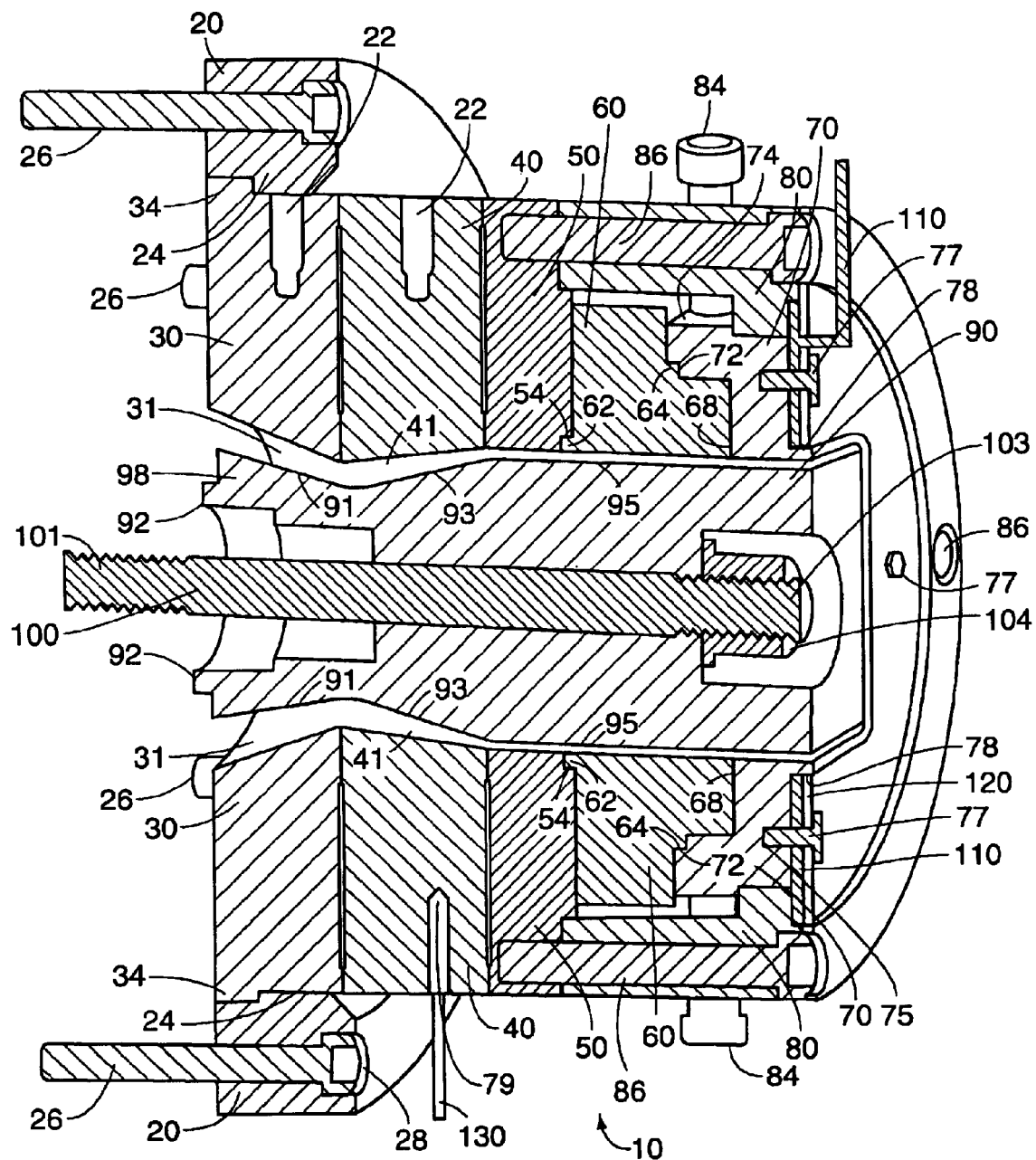
FIG. 3B shows a longitudinal-sectional view of the extrusion die rotated 90° relative to FIG. 3A.

A description of preferred embodiments of the invention follows.

In general, FIGS. 1A–C refer to one embodiment of the invention. In the embodiment of FIGS. 1A–C, a dual co-extrusion setup 2 is used to extrude two simultaneous profiles (not shown) using one main extruder (not shown) and one co-extruder (not shown). The dual co-extrusion setup 2 comprises a "Y" adapter 4; dual-line co-extrusion assembly 6; two spider pipe heads 8; and two adjustable profile dies 10 and is shown assembled in FIGS. 1A–C. In the direction of flow path 12, the main extruder injects substrate into the "Y" adapter 4 which divides the substrate into two separate flows. In the direction of flow path 14, the co-extruder injects capstock (not shown) into the co-extrusion assembly 6. Inside a co-extrusion assembly 6, the capstock is divided into separate flows and the capstock and substrate of each flow are bonded together to form two separate flows of capstock coated substrate (CCS). Each flow of CCS flows from the co-extrusion assembly 6 into a separate spider pipe head 8 and into a respective adjustable profile die 10. The CCS enters the two (2) adjustable profile dies 10 in circular form and each adjustable profile die transforms the CCS into a desired cross-sectional profile. The extrusions exit the two adjustable profile dies 10 simultaneously in the direction of flow path 16.

In other embodiments of the invention, the adjustable profile die 10 can be connected to any extrusion head using any extrusion setup.

FIGS. 2A and B show the components of adjustable profile die 10. In one embodiment of the invention, the adjustable profile die 10 can be made of stainless steel or another material used in the industry. The adjustable profile die 10 comprises the following components: (1) retaining ring 20; (2) bushing plate 30; (3) bushing plate 40; (4) bushing plate 50; (5) adjusting plate 60; (6) adjusting plate 70; (7) adjusting retaining ring 80; (8) profile pin 90; (9) draw bar 100; (10) heat plate 110; (11) heat plate cover 120; and (12) thermal sensor 130.

Referring to FIGS. 2–6, the CCS flows from spider pipe head 8 and between bushing plate 30 and profile pin 90 where section 31 of bushing plate 30 maintains the circular exterior of the extrusion and section 91 of profile pin 90 maintains the circular interior form of the extrusion. The CCS proceeds to flow between bushing plate 40 and profile pin 90 where section 41 of bushing plate 40 shapes the non-circular profile of the extrusion's exterior and section 93 of profile pin 90 shapes the non-circular profile of the extrusion's interior. The CCS then flows between bushing plate 50 and profile pin 90 where section 51 of bushing plate 50 and section 95 of profile pin 90 maintain the non-circular profile of the extrusion's exterior and interior respectively.

The wall thickness of two opposing sides of the extrusion can be adjusted as the CCS flows between adjusting plate 60 and profile pin 90. Section 95 of the profile pin 90 maintains the non-circular profile of the extrusion's interior. Section 61 of adjusting plate 60 maintains the non-circular profile of the extrusion's exterior while the wall thickness is adjusted. Shoulders 62 of adjusting plate 60 sit in adjusting channel 54 of bushing plate 50. The adjusting channel 54 restricts adjusting plate 60 from rotating to provide an even profile form as shown in FIG. 6A. Without being properly located to bushing plate 50, adjusting plate 60 could rotate creating a non-even profile as shown in FIG. 6B. Rotating adjusting screws 82 in or out adjusts the wall thickness of two opposing sides of the extrusion where adjusting plate 60 is moved in either direction 63 or direction 65 in the adjusting channel 54. In the preferred embodiment, adjusting plate 60 is restricted to movement in the "X" direction in an x-y coordinate system.

The wall thickness of the other two opposing sides of the extrusion can be adjusted as the CCS flows between adjusting plate 70 and profile pin 90. Section 95 of the profile pin 90 maintains the non-circular profile of the extrusion's interior. Section 71 of adjusting plate 70 maintains the non-circular profile of the extrusion's exterior while the wall thickness is adjusted. Shoulders 72 of adjusting plate 70 sit in adjusting channels 64 and over protrusion 68 of adjusting plate 60. Adjusting channels 64 restrict adjusting plate 70 from rotating to provide an even profile form as shown in FIG. 6A. Without being properly located to adjusting plate 60, adjusting plate 70 could rotate creating a non-even profile as shown in FIG. 6B. Rotating adjusting screws 84 in or out adjusts the wall thickness of the other two opposing sides of the extrusion where the adjusting plate 70 is moved in either direction 73 or direction 79 in the adjusting channel 64. In the preferred embodiment, adjusting plate 70 is restricted to movement in the "Y" direction in an x-y coordinate system.

Figure 4A:
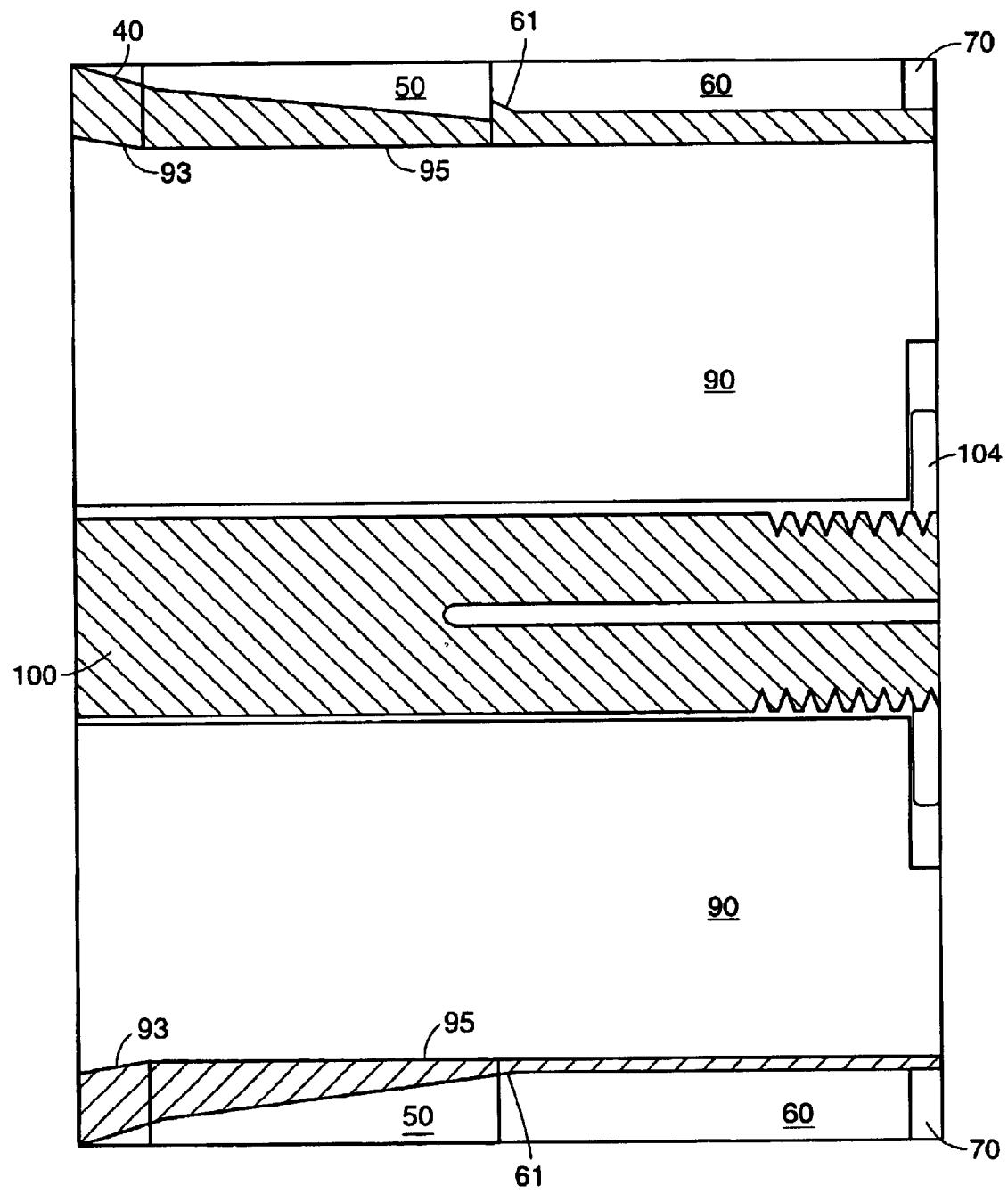
FIG. 4A shows a longitudinal-sectional view of an enlarged section of the extrusion die highlighting a shift of adjusting plate 1.
Figure 4B:
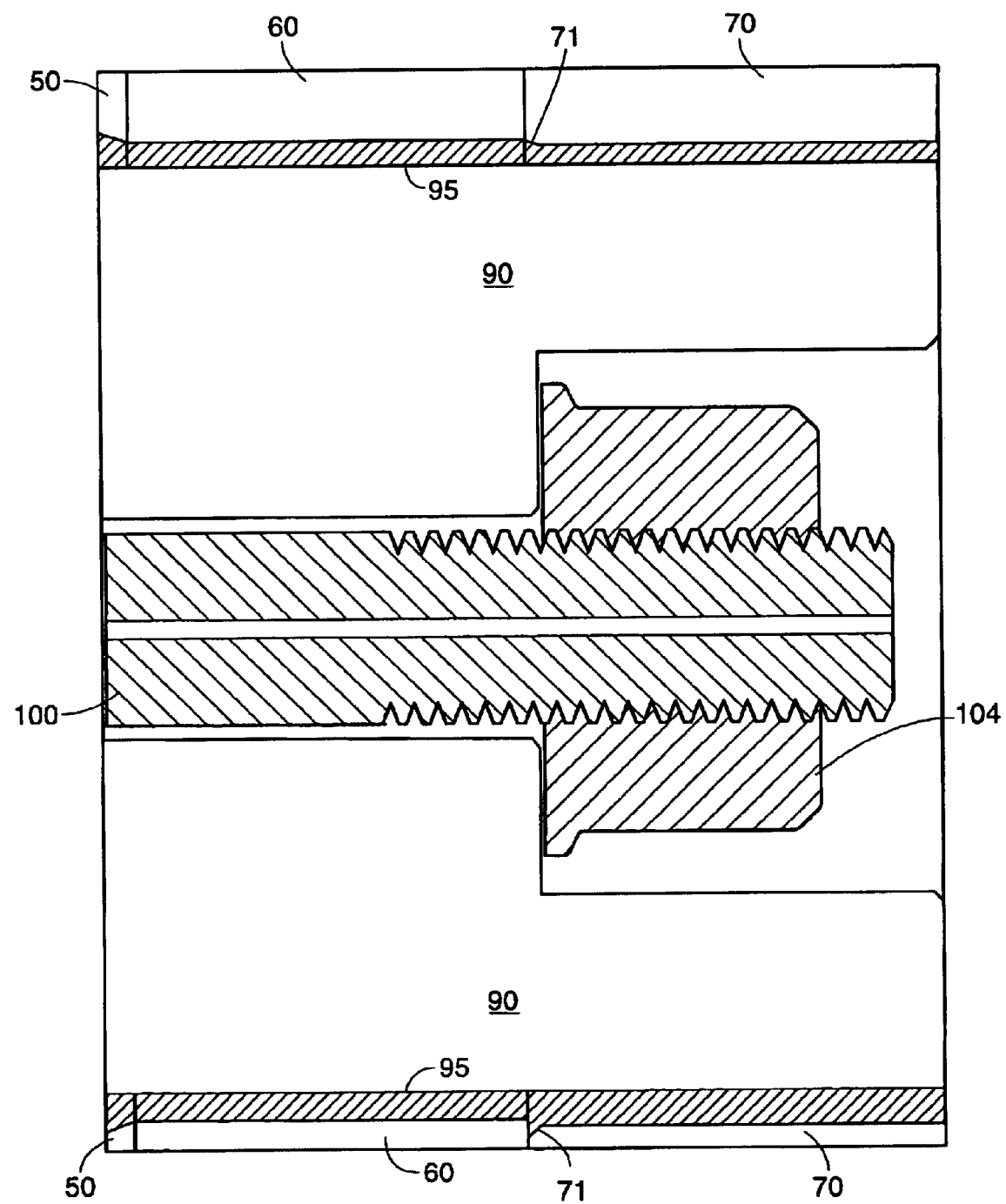
FIG. 4B shows a longitudinal-sectional view of an enlarged section of the extrusion die highlighting a shift of adjusting plate 2.
Figure 5:
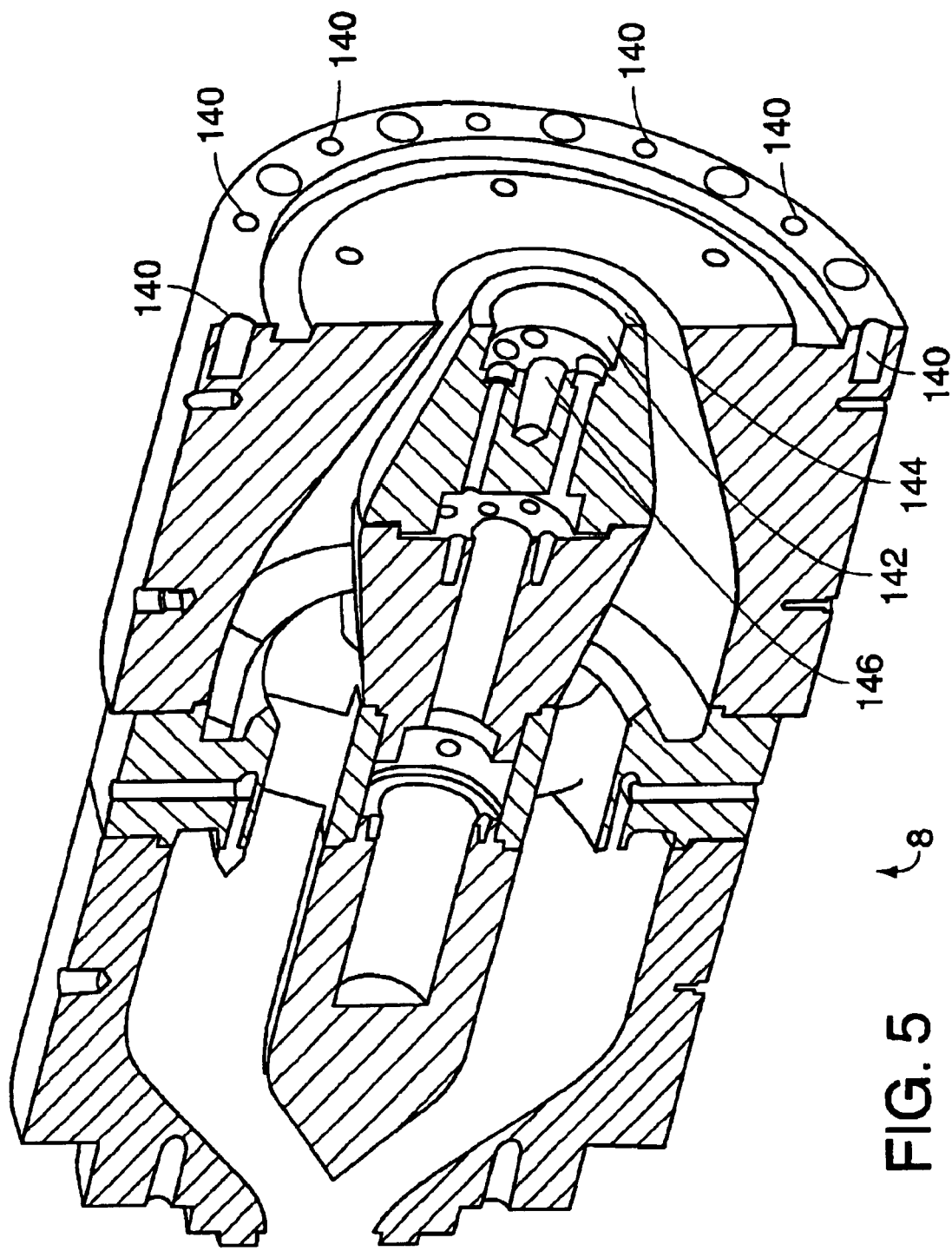
FIG. 5 shows a longitudinal-sectional view of a spider pipe head to which the extrusion die is connected.

Both adjusting plates can be adjusted to shift the extrusion walls to any x-y coordinate desired. With adjustment, the openings of the adjustment plates may be offset relative to each other and to the opening of bushing plate 50, creating an offset in the melt flow path. To avoid an interruption in flow at such an offset which could result in burning of the melt, the lead-in edge of each opening is beveled. FIG. 4A shows a shift of adjusting plate 60 where the lead-in edges 61 allow the melt to follow without interruption. The shift on the adjusting plate 60 results in an increases of one side of the passageway between adjusting plate 60 and profile pin 90 while decreasing the other side of the passageway. In a view orthogonal to FIG. 4A, FIG. 4B shows a shift of adjusting plate 70 where the lead-in edges 71 allow the melt to follow without interruption. The shift on the adjusting plate 70 results in an increases of one side of the passageway between adjusting plate 70 and profile pin 90 while decreasing the other side of the passageway. The product of adjusting the adjusting plates results in a symmetrical profile as shown in FIG. 6A. Preferably, horizontal lead-ins are at least 20/1000 and vertical lead-ins are at least 6/1000.

The extrusion exits the adjustable extrusion die 10 between lip 78 of adjusting plate 70 and section 95 of profile pin 90. A heat plate 110 is installed on the adjustable extrusion die 10 to maintain the proper viscosity of the CCS flowing through the die. The heat plate 110 sits over lip 78 and flush to the face of protrusion 76 of adjusting plate 70.

The heat plate cover 120 sits on the heat plate 100 and holds the heat plate 110 to adjusting plate 70 by bolts 77. Bolts 77 secure to threaded holes 75 in adjusting plate 70. Thermal sensors 130 are needed to sense the temperature of the CCS flowing through adjustable profile die 10 and are inserted in thermal bores 79 located in bushing plate 40 and adjusting plate 70. Heat plates 110 can be located anywhere on the extrusion die 10 or within the profile pin 90.

Bushing plate 40 is coupled between bushing plate 30 and bushing plate 50 such that the CCS cannot leak through the joint between bushing plate 30 and bushing plate 40 and the joint between bushing plate 40 and bushing plate 50. The bushing plates are fastened together by inserting bolts (not shown) through counterbore holes 42 in bushing plate 50, holes 42 in bushing plate 40, and secured to threaded holes 42 in bushing plate 30.

Adjusting retaining ring 80 sits over protrusion 76 of adjustment plate 70 and houses adjusting plate 60 and adjusting plate 70. The adjusting retaining ring 80 is coupled to bushing plate 50 such that the CCS cannot leak through the joint between bushing plate 50 and adjusting plate 60 and the joint between adjusting plate 60 and adjusting plate 70. The adjusting retaining ring 80 fastens to bushing plate 50 by inserting bolts 86 through counterbore holes 87 in adjusting retaining ring 80 and secured to threaded holes 56 in bushing plate 50. Adjusting bolts 82 are moveable within threaded holes 83 in adjusting retaining ring 80 and sit squarely on adjustment plate 66 of adjusting plate 60. Adjusting bolts 82 are required to hold adjusting plate 60 in a desired position during the extrusion process. Adjustment bolts 84 are moveable within threaded holes 85 in adjusting retaining ring 80 and sit squarely on adjustment plate 74 of adjusting plate 70. Adjusting bolts 84 are required to hold adjusting plate 70 in a desired position during the extrusion process. In another embodiment, the adjusting bolts can be operated automatically or remotely by other than manual means.

Profile pin 90 is coupled to spider pipe head 8 by draw bar 100. Protrusion 92 of profile pin 90 fits within bore 142 of the spider pipe head 8. Draw bar 100 defines proximal end 101 and distal end 103 where both proximal and distal ends are threaded. The proximal end 101 secures to threaded hole 146 in spider pipe head 8. Nut 104 secures to the distal end 103 of draw bar 100 to couple profile pin 90 flush to edge 144 of the spider pipe head 8 such that the CCS cannot leak into the joint between the spider pipe head 8 and profile pin 90.

The adjustable profile die 10 is coupled to the spider pipe head 8 by retaining ring 20. The flange 34 of bushing plate 30 sits within bore 24 of retaining ring 20 which holds the adjustable extrusion die 10 flush to the spider pipe head 8 such that the CCS cannot leak through the joint created by joining the spider pipe head 8 with the adjustable extrusion die 10. Installation assist holes 22 in bushing plate 30 and bushing plate 40 are provided to assist in the installation procedure of the adjustable extrusion die 10. Retaining ring 20 fastens to the spider pipe head 8 with bolts 26. The bolts 26 are inserted in counterbore slot holes 28 and secured to threaded holes 140 in the spider pipe head 8.

While this invention has been particularly shown and described with references to preferred embodiments thereof, it will be understood by those skilled in the art that various changes in form and details may be made therein without departing from the scope of the invention encompassed by the appended claims.

What is claimed is:

1. An extrusion die comprising:
   a bushing plate having a flow path therein shaping an exterior profile of melt flowing therethrough to a non-circular cross-sectional profile;
   a profile pin within the flow path of the bushing plate shaping an interior profile of the flowing melt; and
   a first adjustment plate facing the bushing plate and surrounding the profile pin and moveable in a direction transverse to the flow of the melt to provide a shift of the non-circular cross-sectional profile of the flowing melt, movement of the first adjustment plate being restricted to be along a first transverse axis.

2. An extrusion die comprising:
   a bushing plate having a flow path therein shaping an exterior profile of melt flowing therethrough to a non-circular cross-sectional profile;
   a profile pin within the flow path of the bushing plate shaping an interior profile of the flowing melt; and
   a first adjustment plate facing the bushing plate and surrounding the profile pin and moveable in a direction transverse to the flow of the melt to provide a shift of the non-circular cross-sectional profile of the flowing melt, movement of the first adjustment plate being restricted to prevent rotation relative to the bushing plate, wherein the bushing plate further comprises:
      non-circular cross-sectional surfaces defining a flow path through the bushing plate to maintain the desired non-circular cross-sectional profile therethrough; and
      opposing protrusions at a distal end from a face of the bushing plate defining at a distal end an adjustment channel which receives shoulders of a first adjustment plate and locates the first adjustment plate therein to prevent rotation of the first adjustment plate relative to the bushing plate.

3. The extrusion die of claim 1, wherein the first adjustment plate further comprises:
   non-circular cross-sectional surfaces defining a flow path through the first adjustment plate to maintain the desired non-circular cross-sectional profile therethrough;
   shoulders at a proximal end from a face of the first adjustment plate moveable within an adjusting channel of a bushing plate to prevent rotation of the first adjustment plate relative to the bushing plate; and
   opposing adjusting channels from a distal face which receive shoulders of a second adjustment plate and locate the second adjustment plate therein to prevent rotation of the second adjustment plate relative to the first adjustment plate.

4. An extrusion die as claimed in claim 1 further comprising:
   a second adjustment plate facing the first adjustment plate and surrounding the profile pin moveable orthogonal to the first adjustment plate to provide an orthogonal shift of the non-circular cross-sectional profile of the flowing melt, movement of the second adjustment plate being restricted to prevent rotation relative to the first adjustment plate.

5. The extrusion die of claim 4, wherein the second adjustment plate further comprises:
   non-circular cross-sectional surfaces defining a flow path through the second adjustment plate to maintain the desired non-circular cross-sectional profile therethrough; and
   opposing shoulders at a proximal end from a face of the second adjustment plate moveable within adjusting channels of a first adjustment plate to prevent rotation of the second adjustment plate relative to the first adjustment plate.

6. An extrusion die as claimed in claim 1 further comprising:

a first bushing plate defining a flow path to maintain the circular cross-sectional profile exterior of the flowing melt;

a second bushing plate defining a flow path to shape the circular melt exterior to the desired non-circular cross-sectional profile exterior of the flowing melt; and a third bushing plate defining a flow path to maintain the desired non-circular cross-sectional profile exterior of the flowing melt.

7. An extrusion die as claimed in claim 1 further comprising:

a first section defining a flow path to maintain the circular cross-sectional profile interior of the flowing melt;

a second section defining a flow path to shape the circular melt interior to the desired non-circular cross-sectional profile interior of the flowing melt; and a third section defining a flow path to maintain the desired non-circular cross-sectional profile interior of the flowing melt.

* * * * *